United States Patent
Vezzani

[11] Patent Number: 5,409,643
[45] Date of Patent: Apr. 25, 1995

[54] METHOD OF MAKING A GRANULAR PRODUCT WITH A HIGH SPECIFIC WEIGHT

[75] Inventor: Corrado Vezzani, Milan, Italy

[73] Assignee: Vomm Impianti E Processi S.r.l., Milan, Italy

[21] Appl. No.: 974,481

[22] Filed: Nov. 12, 1992

[30] Foreign Application Priority Data

Nov. 13, 1991 [IT] Italy .................. MI91A3021

[51] Int. Cl.6 .................................. B29B 9/08
[52] U.S. Cl. ............................ 264/8; 264/9; 264/12
[58] Field of Search ............ 264/5, 12, 8, 9, 117; 423/332

[56] References Cited

U.S. PATENT DOCUMENTS

| | | | |
|---|---|---|---|
| 3,868,227 | 2/1975 | Gericke et al. | 264/117 |
| 4,011,302 | 3/1977 | Defrawi | 423/332 |
| 4,528,149 | 7/1985 | Wichelhaus et al. | 264/5 |
| 4,589,988 | 5/1986 | Rieck et al. | 252/8.8 |

Primary Examiner—Allan R. Kuhns
Attorney, Agent, or Firm—Birch, Stewart, Kolasch & Birch

[57] ABSTRACT

A method for making a granular product including sodium silicate and its water of crystallization, having a specific weight of from 0.5 to 1.2 and completely soluble in water at ambient temperature includes the step of granulating a pseudoplastic mass of sodium silicate having a free water content of between 5 and 12% by weight under hot conditions in an air-steam environment.

6 Claims, 1 Drawing Sheet

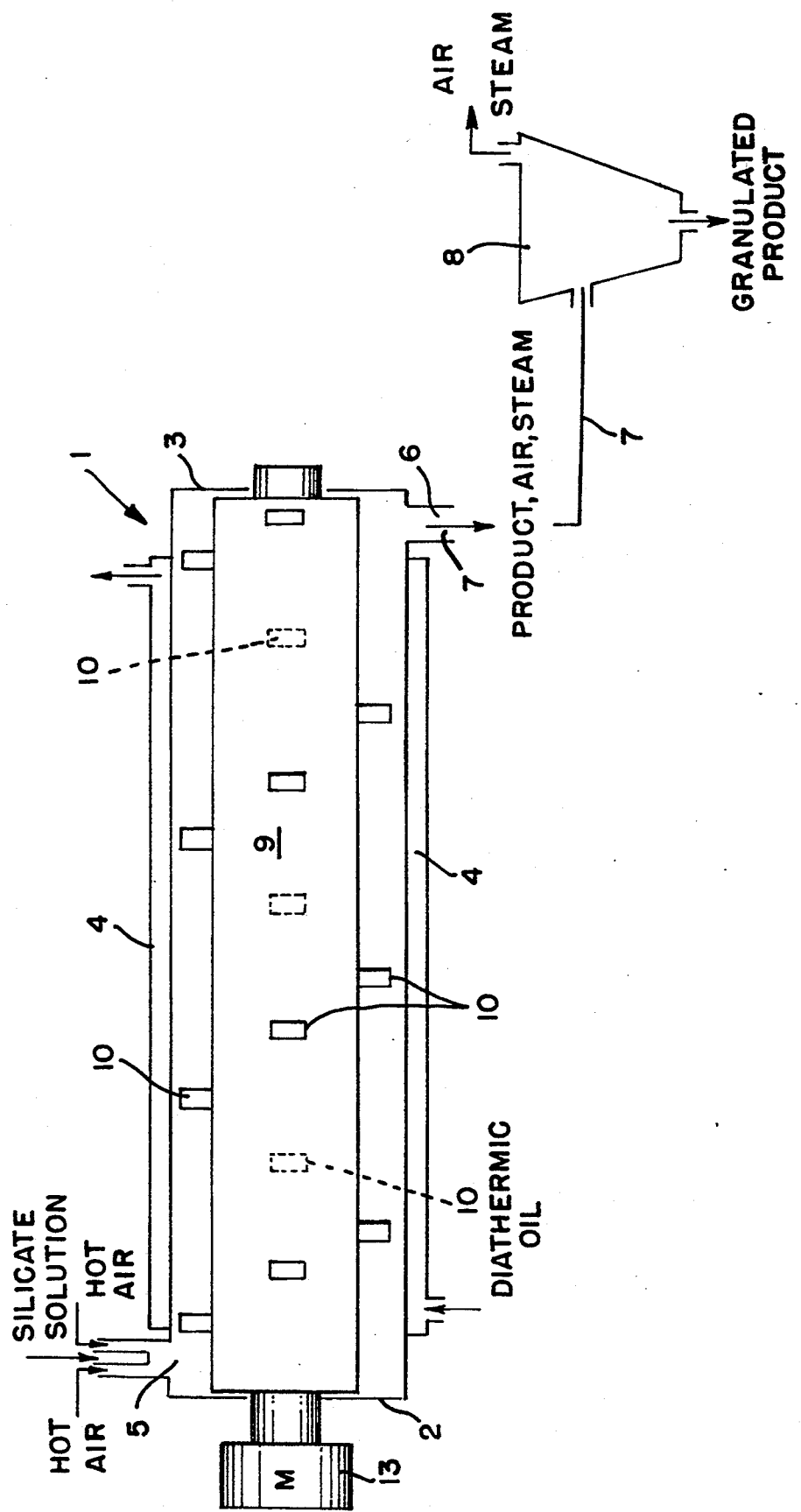

METHOD OF MAKING A GRANULAR PRODUCT WITH A HIGH SPECIFIC WEIGHT

BACKGROUND OF THE INVENTION

1. Field of the Invention

The present invention relates in general to a granular product particularly, but not exclusively, for use as an additive for powdered detergents.

More particularly, the invention relates specifically to granulated sodium silicate having a specific weight comparable with that of the usual components, more usually used in powdered detergent compositions.

2. Description of Related Art

It is well known that sodium silicates have been used intensively in the detergent industry as basic components of soaps since long before the advent of synthetic surfactants, particularly because of their well known sequestering properties towards magnesium and calcium.

Furthermore, they act as anti-corrosion agents and are effective in preventing the deterioration of washing machines, particularly the metal parts thereof.

Commercial alkaline silicates are generally characterised by their $SiO_2:Na_2O$ ratio in the molecules. Silicates used in detergent compositions have a ratio greater than 1, generally about 2.4.

An alkaline silicate with a 1:1 ratio, that is to say sodium metasilicate, is considered too corrosive to be used safely and widely in detergent compositions for domestic use. Instead, for this purpose, it is usually felt necessary to replace the sodium metasilicate by an equivalent quantity of sodium silicate.

With regard to liquid compositions, generally used for washing-up liquids, the use of sodium silicate does not present any difficulty while a similar use in powdered detergents has recognized problems which until now have had to be accepted.

Dry sodium silicate, in fact, because of the way in which it has been manufactured until now, has a relatively low specific weight of the order of 0.2–0.4 and, in any case, considerably less than the specific weight of the dry components with which it is combined in the overall formulation of powdered detergents. For this reason, during storage or during any period in which the packaged detergent composition is at rest, it tends to segregate, substantially reducing the desired uniformity of behaviour of doses taken from different points in the package.

In order to overcome this problem it has been thought to manufacture the other components with equally low specific weights but this device has resulted in the sale and use of very light powdered detergents. The large volumes of these compositions has involved considerable transport, storage and packaging costs etc.

The methods of drying the sodium silicate used until now have been carried out with the use of spray towers supplied with solutions with low silicate concentrations (generally 20 to 30% dry content) or with rotary drum dryers which are supplied with solutions with higher concentrations.

In both cases, it has not until now been possible to obtain dry sodium silicate with a specific weight greater than the value of 0.4 mentioned above, this being particularly due to the fact that, when subjected to a drastic heat drying treatment, the silicate explodes in a phenomenon known as the "popcorn" effect and the flakes generated by such explosions incorporate air and thus have very low apparent densities and hence low specific weights.

Various attempts have been made to increase the "weight" of sodium silicate granules mainly with the use of rotary drum dryers. These attempts essentially provide for the periodic wetting, during the drying, of the silicate granules being formed obtaining what is termed in this branch of the art, recompaction of the silicate powder. The granules which are finally discharged from the dryer, along with a satisfactory grain size, have an appropriate specific weight, that is to say about 1, but are entirely insoluble. This negative aspect would seem to be due to the necessarily prolonged contact of the granules with the heating means with the consequent thorough dehydration of at least a surface layer of the granules with the elimination of the water of crystallization of the sodium silicate therefrom. The consequent vitrification of this surface layer renders the entire granule insoluble.

The problem underlying the present invention is that of providing a sodium silicate which can be obtained by a method which can be carried out on an industrial scale and which has physico-chemical characteristics such as to satisfy current requirements in the detergent field, as specified above, and which at the same time overcomes the problems mentioned with reference to the prior art.

SUMMARY OF THE INVENTION

This problem is solved according to the invention by a method for making a granular product including sodium silicate and its water of crystallization, having a specific weight of from 0.5 to 1.2 and completely soluble in water at ambient temperature comprising the step of granulating a pseudoplastic mass of sodium silicate having a free water content of between 5 and 12% by weight under hot conditions in an air-steam environment.

The advantages and characteristics of this invention will become more apparent from the following description of one embodiment of a method for the production of granular sodium silicate, given below with reference to the appended drawing given purely by way of non-limiting example which shows schematically an apparatus for carrying out this method.

BRIEF DESCRIPTION OF THE FIGURE

The FIGURE is a schematic representation of an apparatus for use in a method of manufacturing a granular product with a high specific weight, particularly an additive for powdered detergents.

DETAILED DESCRIPTION OF PREFERRED EMBODIMENTS

With reference to the drawing, the apparatus used for the production of granular sodium silicate according to the invention is of the type generally termed a turbodryer-granulator and comprises essentially a cylindrical tubular body 1 closed at opposite ends by end walls 2, 3 and having a coaxial heating chamber 4 intended to be traversed by, for example, diathermic oil.

The tubular body 1 has an inlet aperture 5 for the sodium silicate to be dried and granulated and an outlet aperture 6 for the granulated product which communicates through a duct 7 with a cyclone separator 8.

A bladed rotor 9 is rotatably supported in the tubular body 1. The blades 10 of this rotor 9 are arranged helically and oriented so as to centrifuge and simultaneously convey the product being treated towards the outlet. A motor 13 is provided for rotating the rotor at speeds which are variable from 200 to 1500 revolutions per minute.

A sodium silicate solution is supplied continuously through the dryer-granulator 1 through the inlet aperture 5 and, from this inlet is taken and worked mechanically by the blades of the rotor 9 which is rotated at a suitable speed.

More particularly, the blades of the rotor 9 centrifuge the solution against the inner heated wall of the dryer-granulator and thrust it towards the outlet aperture 6.

A flow of hot air is supplied to the dryer-granulator simultaneously with the sodium silicate solution and, in cooperation with the heated wall, effects the drying of the sodium silicate.

The temperature of the wall, that of the heated air and the speed of rotation of the bladed rotor are selected such that the silicate solution loses moisture gradually, even though rapidly, changing from its initial liquid condition to a substantially pseudoplastic viscous condition in a relatively short time, for example, from 0.1 to 8–10 minutes.

In these conditions, the free water content of the pseudoplastic mass is between 5 and 12% by weight.

It is fundamental and critical that such a pseudoplastic condition should be achieved in order for the present invention to be carried out as will become clearer from the description below.

For this purpose, a sodium silicate solution with a 40–60% dry weight content is supplied to the dryer-granulator 1 in which a wall temperature of between 160° and 200° C. and a hot air temperature of between 220° and 260° C. are particularly advantageous while the speed of rotation of the bladed rotor 8 is controlled within the range 400 to 1500 revolutions per minute.

Still for this purpose, the hot air flow is to advantage supplied in equicurrent with the sodium silicate solution. More particularly, and in accordance with a characteristic of this invention, the flows of hot air and silicate solution are supplied through the same inlet aperture 5 where the air partly atomizes the solution.

Obviously for associated technical reasons, the dryer-granulator 1 may have one or more inlet apertures 5 through each of which the hot air and the silicate solution are supplied simultaneously.

When the silicate has reached the said pseudoplastic paste condition, small pseudoplastic masses (granules) start to form continuously due to the effect of the blades which rotate at a predetermined velocity in the paste, these granules being centrifuged against the hot wall of the dryer-granulator (while, we should remember, they are also thrust towards the outlet aperture) where they undergo continuous dehydration and are gradually transformed into spheroidal granules proper.

It should be noted that, because of the temperature of the heated wall and of the treatment air, because of the short contact times with the hot wall (times which, from the moment at which each small pseudoplastic mass forms to the discharge of the corresponding dried granule, vary from about 0.1 to 10 minutes) and because of the presence of the hot air and moisture (at the limit, vapor), the dehydration of the small pseudoplastic masses hardly involve the water of crystallization of the sodium silicate and thus any surface vitrification of the granules being formed is safely avoided.

The sodium silicate granules (which, we repeat, retain all their water of crystallization) thus obtained are particularly and surprisingly dense, having specific weights of between 0.5 and 1.2 and are completely soluble in water at ambient temperatures.

The grain size of the sodium silicate thus obtained can be controlled easily by control of the functional parameters of the dryer-granulator.

On discharge from the dryer, the outlet flow which includes dried sodium silicate granules, air and steam should have a temperature of between 95° and 115° C. At lower temperatures the product may agglomerate while at higher temperatures the so-called "popcorn" phenomenon, that is to say the explosion of the granules just obtained, may occur with the production of low density flakes with low specific weights.

The flow leaving the dryer-granulator is sent to a cyclone separator 8 from which the desired product is discharged and delivered for packaging.

EXAMPLE 1

With the use of the apparatus described schematically above and following the method of the invention, a sodium silicate solution with a 52% dry content was supplied continuously to the dryer-granulator 1 simultaneously with a hot air flow at a temperature of 220° C. which achieved an initial atomizing of the solution.

The wall temperature was maintained at about 160° C. while the speed of rotation of the bladed rotor was kept at a constant 850 revolutions per minute. After about seven minutes of mechanical action by the rotor and heat exchange with the hot wall and the hot air flow, the initial sodium silicate solution was converted into a pseudoplastic mass having a free water content of about 10% by weight. On discharge from the dryer-granulator, the flow including sodium silicate granules, air and steam was at a controlled temperature of about 100° C. Dried sodium silicate granules were discharged from the subsequent cyclone separator at a temperature of about 20° C. and with a grain size within the range 200 to 400 microns.

These sodium silicate granules had a specific weight of 0.9 and were completely soluble in water at 20° C.

Furthermore, from an analysis of the granules obtained it was found that the sodium silicate forming them included all its water of crystallization.

EXAMPLE 2

The procedure of Example 1 was repeated with the use of a sodium silicate solution with a 60% dry weight content and hot air at 260° C. The wall temperature was maintained at 180° C. while the speed of the bladed rotor was fixed at 980 revolutions per minute. After about nine minutes, the initial sodium silicate solution was converted into a pseudoplastic mass having a free water content of about 6%. The temperature of the flow including dried granules, moist air and steam, was controlled at about 110° C.

The dried, cold granules thus discharged from the cyclone separator had a specific weight of 1.0, were completely soluble in water at 20° C and had a grain size of between 800 microns and 1 mm.

On analysis each granule showed that the sodium silicate included all its water of crystallization.

The invention thus conceived can be varied and modified while remaining within the scope of protection concerned. While the fundamental, critical conditions of the method of the invention for obtaining granulated sodium silicate with a high specific weight which is completely soluble in water remain the same, these being constituted by the formation of small pseudoplastic masses from a pseudoplastic mass of sodium silicate, having a predetermined free water content and in which the silicate includes all its water of crystallization, and the thermal dehydration of these small pseudoplastic masses in an air-steam ambient, many variations may be made even at the level of the composition of the solution supplied, such as the physico-chemical quantities concerned and the structural characteristics of the apparatus, all depending on the particular properties which it is intended to give to the final granulated product beyond those specifically sought by the present invention. Thus, for example, the sodium silicate solution may include other additives such as dispersing agents intended to increase the rapidity with which the silicate granules dissolve in cold water and so on.

It should also be noted that the method of the invention, described with reference to sodium silicate, may be used for the production of granules of other substances when it is desired to increase their specific weight.

I claim:

1. A method for the continuous production of a granular product including sodium silicate and its water of crystallization, having a specific weight of from 0.5 to 1.2 and completely soluble in water at ambient temperature with the use of a dryer-granulator comprising a tubular cylindrical body with a heating jacket having inlet and outlet apertures and a bladed rotor rotatably supported in the cylindrical tubular body, comprising the successive steps of:

supplying a sodium silicate solution with a dry content of 40–60% continuously to the dryer-granulator having a hot wall at a temperature of between 160° C. and 200° C., simultaneously with a hot air flow at a temperature of between 220° C. and 260° C.;

working the solution mechanically by means of a bladed rotor which is rotated at a suitable speed to obtain a pseudoplastic mass having a free water content of between 5 and 12% by weight; and forming the pseudoplastic mass continuously, still by means of the mechanical action of the bladed rotor, into small masses or pseudoplastic granules which are centrifuged against the hot wall of the dryer-granulator where they undergo continuous dehydration in a hot air-steam ambient.

2. The method according to claim 1, wherein the hot air flow is supplied in equicurrent with the sodium silicate solution.

3. The method according to claim 2, wherein the hot air flow and the sodium silicate solution are supplied continuously to the dryer-granulator through the inlet aperture.

4. The method according to claim 3, wherein the hot air flow substantially atomizes the sodium silicate solution.

5. The method according to claim 1, wherein a flow including sodium silicate granules, air and steam, at a temperature which is controlled within the range 95° C. to 115° C. is discharged from the dryer-granulator.

6. The method according to claim 1, wherein the sodium silicate solution supplied to the dryer-granulator also includes dispersing agent additives.

* * * * *